US012651478B2

(12) United States Patent
Lee et al.

(10) Patent No.: US 12,651,478 B2
(45) Date of Patent: Jun. 9, 2026

(54) APPARATUS AND METHOD FOR PROVIDING FINGERPRINT RECOGNITION, METHOD OF LEARNING ARTIFICIAL NEURAL NETWORK FOR FINGERPRINT RECOGNITION

(71) Applicant: Suprema Inc., Seongnam-si (KR)

(72) Inventors: Jong Man Lee, Seongnam-si (KR); Young Mook Kang, Seongnam-si (KR); Beom Jun Kim, Seongnam-si (KR); Jae Hyun Park, Seongnam-si (KR); Hochul Shin, Seongnam-si (KR)

(73) Assignee: Suprema Inc., Seongnam-si (KR)

( * ) Notice: Subject to any disclaimer, the term of this patent is extended or adjusted under 35 U.S.C. 154(b) by 0 days.

(21) Appl. No.: 18/975,843

(22) Filed: Dec. 10, 2024

(65) Prior Publication Data

US 2026/0141748 A1 May 21, 2026

(30) Foreign Application Priority Data

Nov. 20, 2024 (KR) ........................ 10-2024-0166583

(51) Int. Cl.
| | |
|---|---|
| *G06V 40/12* | (2022.01) |
| *G06V 10/75* | (2022.01) |
| *G06V 10/77* | (2022.01) |
| *G06V 10/82* | (2022.01) |

(52) U.S. Cl.
CPC ........ *G06V 40/1347* (2022.01); *G06V 10/751* (2022.01); *G06V 10/7715* (2022.01); *G06V 10/82* (2022.01); *G06V 40/1365* (2022.01)

(58) Field of Classification Search
CPC ........... G06V 40/1347; G06V 10/7715; G06V 40/1365; G06V 10/82; G06V 10/751
See application file for complete search history.

(56) References Cited

U.S. PATENT DOCUMENTS

| | | | |
|---|---|---|---|
| 2020/0193117 A1 * | 6/2020 | Raff | G06N 3/048 |
| 2022/0012464 A1 * | 1/2022 | Kim | G06V 40/13 |
| 2025/0284783 A1 * | 9/2025 | Maharramov | G06F 21/32 |

* cited by examiner

*Primary Examiner* — Lixi C Simpson
(74) *Attorney, Agent, or Firm* — Bridgeway IP Law Group, PLLC; Jihun Kim

(57) ABSTRACT

An apparatus for fingerprint recognition comprises: at least one memory capable of storing computer-executable instructions for generating unique feature information on fingerprint from a plurality of fingerprint information using a pre-trained artificial neural network; a fingerprint sensing module configured to obtain a fingerprint image of a finger; and a processor configured to, by executing the instructions, obtain a plurality of fingerprint information from the fingerprint image; and perform the instructions to process to generate a plurality of fingerprint images reflecting a plurality of state change information based on the plurality of fingerprint information, and to generate the unique feature information for the plurality of fingerprint images, wherein the plurality of state change information includes limited information within a range constrained by deviations of the plurality of fingerprint information.

16 Claims, 5 Drawing Sheets

100

APPARATUS AND METHOD FOR PROVIDING FINGERPRINT RECOGNITION, METHOD OF LEARNING ARTIFICIAL NEURAL NETWORK FOR FINGERPRINT RECOGNITION

CROSS-REFERENCE TO RELATED APPLICATION

This application claims priority to Korean Patent Application No. 10-2024-0166583, filed on Nov. 20, 2024, the entirety of which is incorporated herein by reference for all purposes.

TECHNICAL FIELD

The present invention relates to fingerprint recognition technology, and to the training of an artificial neural network for fingerprint recognition. This work was supported by Institute of Information & communications Technology Planning & Evaluation (IITP) grant funded by the Korea government (Ministry of Science and ICT) (Project unique No.: 2710007816; Project No.: II201787; R&D project: Information and Communication Broadcasting Innovation Talent Training (R&D); Research Project Title: Development of communication/computing convergence innovation technology for super-intelligent services; and Project period: 2024.01.01.~2024.12.31.).

BACKGROUND

Recently, with the development of smartphones and various mobile/wearable devices, the importance of security authentication technology has been increasing. Fingerprint recognition technology, which is one of the security authentication technologies, is widely used due to its advantages in convenience, security, and cost-effectiveness. In fingerprint recognition, generally, a user's fingerprint image is obtained through a sensor, and the obtained fingerprint image is compared with a pre-enrolled fingerprint image to authenticate the user.

In this case, for the fingerprint image obtained during enrollment, there are limitations in reflecting various state changes in the fingerprint (e.g., deformation (distortion), condition (wet, dry, normal, etc.), rotation, and other factors of the fingerprint). For example, the fewer fingerprint images obtained during enrollment, the more difficult it becomes to reflect this diversity. This difficulty is further amplified, especially in cases where enrollment is done through a single fingerprint acquisition (one-shot enrollment). The lack of such diversity may lead to authentication failures during fingerprint recognition, which may result in degradation of fingerprint recognition performance.

In contrast, even if multiple fingerprint images are used for fingerprint enrollment, there are limitations in capturing various state changes of the fingerprint in multiple images obtained at approximately the same time, and the more images that are obtained during enrollment, the greater the inconvenience experienced by the user.

The above-mentioned background art is technical information that the inventors have retained to derive the present invention or have obtained in the course of deriving the present invention, and cannot therefore be said to be technical information publicly known to the public before filing the invention.

SUMMARY

In an embodiment of the present invention, there is provided a fingerprint recognition technology capable of reflecting the diversity of fingerprint state distorted by changes, e.g., humidity, pressure, deformation, etc. while utilizing only the unique features of the fingerprint, which are robust to state changes.

In an embodiment of the present invention, there is provided a technology for training an artificial neural network to generate fingerprint images reflecting various states of fingerprints and to provide unique features for the corresponding fingerprint images.

However, the problem to be solved by the present disclosure is not limited to that mentioned above, and other problems to be solved that are not mentioned may be clearly understood by those of ordinary skill in the art to which the present disclosure belongs from the following description.

In accordance with an aspect of the present disclosure, there is provided an apparatus for fingerprint recognition, the apparatus comprising: at least one memory capable of storing computer-executable instructions for generating unique feature information on fingerprint from a plurality of fingerprint information using a pre-trained artificial neural network; a fingerprint sensing module configured to obtain a fingerprint image of a finger; and a processor configured to, by executing the instructions, obtain a plurality of fingerprint information from the fingerprint image; and perform the instructions to process to generate a plurality of fingerprint images reflecting a plurality of state change information based on the plurality of fingerprint information, and to generate the unique feature information for the plurality of fingerprint images, wherein the plurality of state change information includes limited information within a range constrained by deviations of the plurality of fingerprint information.

The range constrained by the deviations may be variable due to deviations between fingerprints input during authentication of the fingerprint image.

The range constrained by the deviations may be settable by a user.

The artificial neural network may include: a fingerprint image generation model pre-trained to generate the plurality of fingerprint images reflecting the plurality of state change information by taking the fingerprint information as input; and a feature extraction model pre-trained to generate first feature information for each of the plurality of fingerprint images and second feature information for a deformation level of each of the plurality of fingerprint images by taking the plurality of fingerprint images as input, and to generate the unique feature information by combining the first feature information and the second feature information. The feature extraction model may be pre-trained to generate the unique feature information by minimizing a category of the plurality of fingerprint images and the deformation level.

The plurality of state change information may include at least one of humidity information, deformation information, or rotation information on the fingerprint information.

The plurality of fingerprint images may include at least one of a wet fingerprint image or a dry fingerprint image according to the humidity information, a deformed fingerprint image according to the deformation information, or a rotated fingerprint image according to the rotation information.

In accordance with another aspect of the present disclosure, there is provided a method for fingerprint recognition performed by a fingerprint recognition apparatus, the method comprising: receiving, in response to a fingerprint authentication request from the fingerprint recognition apparatus, a plurality of fingerprint information as input from a fingerprint image of a finger; generating, based on the fingerprint information, a plurality of fingerprint images reflecting a plurality of state change information; comparing the plurality of fingerprint images with preset fingerprint enrollment information; and allowing authentication for the fingerprint information when the plurality of fingerprint images match the preset fingerprint enrollment information, wherein the plurality of state change information includes limited information within a range constrained by deviations of the plurality of fingerprint information, the range constrained by the deviations being variable due to deviations between fingerprints input during the fingerprint authentication request.

The preset fingerprint enrollment information may include a fingerprint image corresponding to the plurality of fingerprint images and unique feature information on the plurality of fingerprint images.

The unique feature information may include information combining first feature information for each of the plurality of fingerprint images and second feature information for a deformation level of each of the plurality of fingerprint images.

The feature extraction model may be pre-trained to generate the unique feature information by minimizing a category of the plurality of fingerprint images and the deformation level.

The plurality of fingerprint images may include at least one of a wet fingerprint image or a dry fingerprint image according to the humidity information, a deformed fingerprint image according to the deformation information, or a rotated fingerprint image according to the rotation information.

In accordance with another aspect of the present disclosure, there is provided a method for training an artificial neural network for fingerprint recognition of a fingerprint recognition apparatus, the method comprising a process of training the artificial neural network to: generate, when a plurality of fingerprint information is input to the fingerprint recognition apparatus, a plurality of fingerprint images reflecting a plurality of state change information based on the fingerprint information; generate first feature information for each of the plurality of fingerprint images, and second feature information for a deformation level of each of the plurality of fingerprint images; and generate unique feature information on the fingerprint information by combining the first feature information and the second feature information.

The method may further comprise a process of training the artificial neural network to: measure deviations between the plurality of fingerprint information; generate the plurality of state change information within a range constrained by the deviations; and generate the plurality of fingerprint images by reflecting the plurality of state change information.

The plurality of state change information may include at least one of humidity information, deformation information, or rotation information on the fingerprint information.

The plurality of fingerprint images may include at least one of a wet fingerprint image or a dry fingerprint image according to the humidity information, a deformed fingerprint image according to the deformation information, or a rotated fingerprint image according to the rotation information.

The method may further comprise a process of training the artificial neural network to minimize a category of the plurality of fingerprint images and the deformation level.

According to an embodiment of the present invention, by reflecting the diversity of fingerprint states distorted by fingerprint state changes, e.g., humidity, pressure, deformation, etc., it is possible to adaptively cope with various environments during fingerprint recognition while securing high fingerprint recognition performance. In addition, according to an embodiment of the present invention, by implementing feature unification for various fingerprint state changes, it is possible to enhance user convenience while minimizing the sense of inconsistency of fingerprint diversity during fingerprint enrollment and authentication processes.

DETAILED DESCRIPTION

Figure 1:
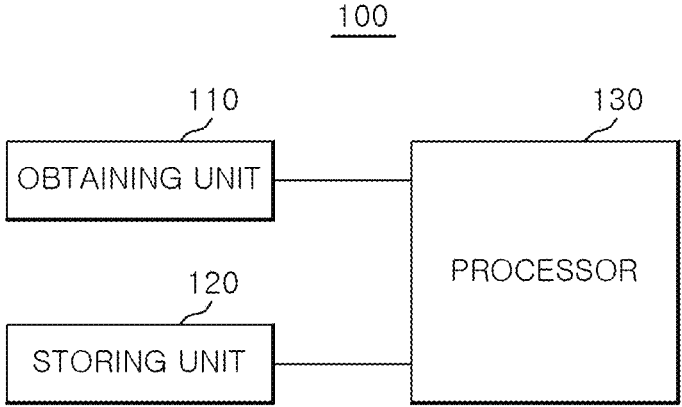
FIG. 1 is a block diagram illustrating the function of a fingerprint recognition apparatus 100 that is robust to fingerprint state changes, according to an embodiment of the present invention.

The advantages and features of the embodiments and the methods of accomplishing the embodiments will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

Terms used in the present specification will be briefly described, and the present disclosure will be described in detail.

In terms used in the present disclosure, general terms currently as widely used as possible while considering functions in the present disclosure are used. However, the terms may vary according to the intention or precedent of a technician working in the field, the emergence of new technologies, and the like. In addition, in certain cases, there are terms arbitrarily selected by the applicant, and in this case, the meaning of the terms will be described in detail in the description of the corresponding invention. Therefore, the terms used in the present disclosure should be defined based on the meaning of the terms and the overall contents of the present disclosure, not just the name of the terms.

When it is described that a part in the overall specification "includes" a certain component, this means that other components may be further included instead of excluding other components unless specifically stated to the contrary.

In addition, a term such as a "unit" or a "portion" used in the specification means a software component or a hardware component such as FPGA or ASIC, and the "unit" or the "portion" performs a certain role. However, the "unit" or the "portion" is not limited to software or hardware. The "portion" or the "unit" may be configured to be in an addressable storage medium, or may be configured to reproduce one or more processors. Thus, as an example, the "unit" or the "portion" includes components (such as software components, object-oriented software components, class components, and task components), processes, functions, properties, procedures, subroutines, segments of program code, drivers, firmware, microcode, circuits, data, database, data structures, tables, arrays, and variables. The functions provided in the components and "unit" may be combined into a smaller number of components and "units" or may be further divided into additional components and "units".

Hereinafter, the embodiment of the present disclosure will be described in detail with reference to the accompanying drawings so that those of ordinary skill in the art may easily implement the present disclosure. In the drawings, portions not related to the description are omitted in order to clearly describe the present disclosure.

Various existing fingerprint recognition technologies are based on fingerprint minutiae, and since these fingerprint minutiae are based on coordinate concepts, it is difficult to capture state information on various fingerprints described above. In addition, in recent biometrics fields, deep learning is being utilized, and one of the revolutionary performance improvements that deep learning technology has brought to face recognition is its ability to extract unique user features that reflect the various state changes of the face (facial expression, angle, makeup, etc.).

In recent years, there have been many attempts to integrate deep learning technology into fingerprint recognition technology, but it is still in a transitional stage toward achieving a leap in performance improvement, and there are many difficulties in extracting unique embedding features that reflect the diversity of fingerprints. That is, in fingerprint recognition using deep learning embedding features, the greater the effort to capture various state changes in a single feature, the more likely it is to adversely impact recognition performance.

In this regard, in an embodiment of the present invention, a robust fingerprint recognition technology is proposed, which is capable of utilizing only the unique features of a fingerprint while reflecting the diversity of fingerprint states that are distorted by state changes, e.g., humidity, pressure, deformation, etc. Further, a technology for training an artificial neural network to generate fingerprint images reflecting various states of a fingerprint and to provide unique features for those fingerprint images is proposed.

Hereinafter, embodiments of the present invention will be described in detail with reference to the accompanying drawings.

FIG. 1 is a block diagram illustrating the function of a fingerprint recognition apparatus 100 that is robust to fingerprint state changes, according to an embodiment of the present invention.

A fingerprint recognition apparatus 100, illustrated in FIG. 1, is an electronic device capable of recognizing a fingerprint so as to be robust to various fingerprint state changes, according to an embodiment of the present invention. In an embodiment of the present invention, the electronic device, for example, may include at least one of a smartphone, an e-book reader, a tablet personal computer, a laptop personal computer, a netbook computer, a desktop computer, a server computer, a wearable device (e.g., a smart watch, smart glasses, a head-mounted-device (HMD), an electronic clothing, an electronic bracelet, an electronic necklace, a smart mirror, etc.). In another embodiment, the electronic apparatus may include at least one of network security equipment, a navigation device, marine electronic equipment (e.g., a marine navigation device, gyrocompass, etc.), avionics, a vehicle head unit, a point of sales in a store, and an Internet of Things device. In addition, the electronic device may be equipped with an application for executing various operations for fingerprint recognition (obtaining fingerprint information, generating and storing fingerprint images, calculating feature information, etc.). The application may include, for example, but need not be limited to, a smartphone application, a personal computer (PC) application, a set-top box (STB) application, a web application, an instant application, and the like.

As illustrated in FIG. 1, the fingerprint recognition apparatus 100 may include an obtaining unit 110, a storing unit 120, and a processor 130.

The obtaining unit 110 may obtain fingerprint information sensed through the fingerprint recognition apparatus 100. The obtaining unit 110 may obtain a fingerprint image of a finger. To sense fingerprint information, the fingerprint recognition apparatus 100 may include, for example, a display module and a fingerprint recognition module or fingerprint sensing module (not illustrated), and may convert a user's contact into an electrical signal via the display module and the fingerprint recognition module and sense the shape of the user's fingerprint via ultrasound or the like.

The storing unit 120 may include a pre-trained artificial neural network, and may include instructions for generating unique feature information on the fingerprint information from the plurality of fingerprint information obtained from the obtaining unit 110 using the artificial neural network. Here, the artificial neural network may be trained to generate a plurality of fingerprint images reflecting the plurality of state change information from the plurality of fingerprint information obtained from the obtaining unit 110, and to generate unique feature information on the generated plurality of fingerprint images. To this end, the neural network may be pre-trained to output a plurality of fingerprint images reflecting at least one piece of information regarding various state information on the fingerprint, for example, humidity information, deformation information, and rotation information. Any instructions in the storing unit 120 may be stored in the form of an application, program, or the like, and any stored instructions may be selected and executed by the processor 130. Such storing unit 120 may include, for example, memory such as random access memory (RAM) and read only memory (ROM), local disks connected via a network, and recording media such as storage, and need not be limited to any particular recording media in implementing embodiments of the present invention. The specific functions of the processor 120 will be described in detail in FIG. 2 below.

The processor 130, by executing instructions in the storing unit 120, may process to generate a plurality of fingerprint images reflecting the plurality of state change information based on the plurality of fingerprint information obtained from the obtaining unit 110, and may process to generate unique feature information on the generated plurality of fingerprint images. Such processor 130 may include, for example, a microprocessor-based processing unit, and the specific operation of processor 130 will be described in more detail with reference to FIGS. 3 to 5 below.

Figure 2:
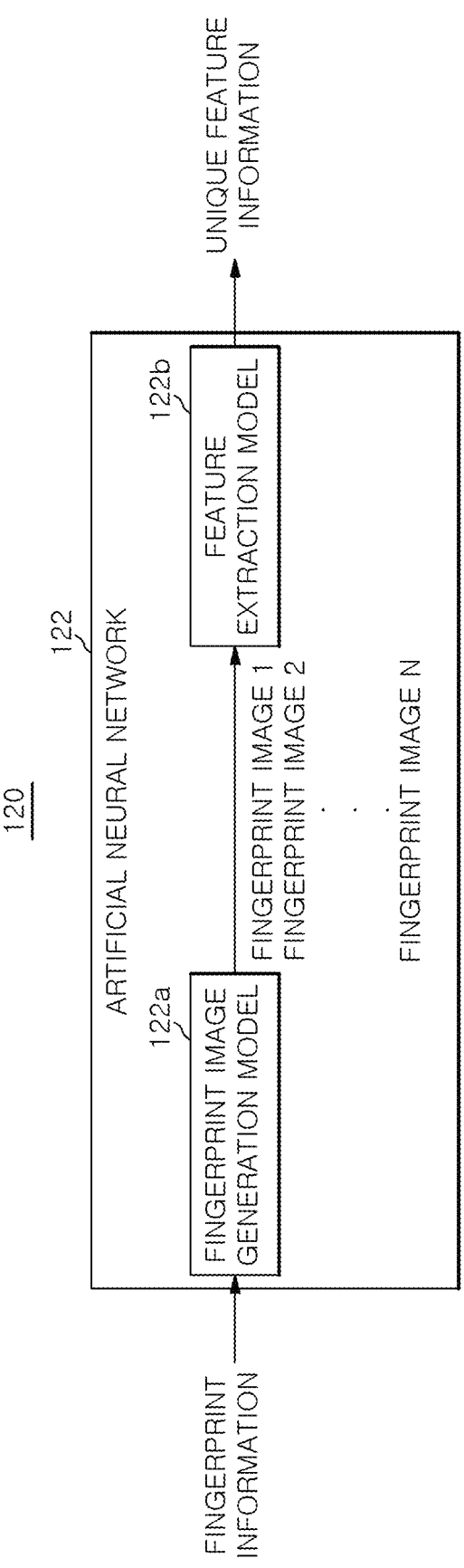
FIG. 2 is a block diagram exemplarily illustrating the function of an artificial neural network 122 included in the storing unit 120 of the fingerprint recognition apparatus 100 in FIG. 1.

FIG. 2 is a block diagram exemplarily illustrating the function of an artificial neural network 122 included in the storing unit 120 of the fingerprint recognition apparatus 100 in FIG. 1.

As illustrated in FIG. 2, the artificial neural network 122 may include a fingerprint image generation model 122a and a feature extraction model 122b.

The fingerprint image generation model 122a may take the plurality of fingerprint information obtained from the obtaining unit 110 as input, and may be trained to generate a plurality of fingerprint images reflecting state change information (at least one of humidity information, deformation information, or rotation information) on the plurality of fingerprint information. Here, the plurality of state change information may include, for example, at least one of humidity information, deformation information, or rotation information on the fingerprint information. In addition, the plurality of state change information may include limited information within a range constrained by the deviations of the plurality of fingerprint information. For example, when the plurality of fingerprint information is input during fingerprint enrollment, the deviation between a plurality of fingerprint information for user A may be measured and the learning environment of the artificial neural network 122 may be constrained to reflect fingerprint state change information within a range up to N times the deviation. In this case, N times is a preset integer, which may be restricted by the deviation of M fingerprints of individuals other than user A who have been previously enrolled, or may be a value set by an administrator. The range constrained by such deviation may be gradually adjusted by the fingerprint image, which is input one by one in the subsequent authentication process.

Further, the plurality of fingerprint images may include, for example, at least one of a wet fingerprint image or a dry fingerprint image according to humidity information, a deformed fingerprint image according to deformation information, or a rotated fingerprint image according to rotation information.

Here, the fingerprint image generation model 122a may include, for example, a style generative adversarial network (style GAN), and through the fingerprint image generation model 122a, at least one of a wet fingerprint image, a dry fingerprint image, a deformed fingerprint image, and a rotated fingerprint image corresponding to the fingerprint information may be generated. At least one fingerprint image may be an image generated as a result of the fingerprint image generation model 122a determining changes in brightness of the image, etc.

The feature extraction model 122b may be trained to take as input a plurality of fingerprint images generated by the fingerprint image generation model 122a, generate first feature information for each of the plurality of fingerprint images and second feature information for a deformation level of each of the plurality of fingerprint images, and combine the first feature information and the second feature information to generate unique feature information.

Here, the feature extraction model 122b may be trained to generate unique feature information by minimizing the category of a plurality of fingerprint images and deformation levels. For example, when a wet fingerprint image A and a dry fingerprint image B are generated, the feature extraction model 122b may generate first feature information using the wet fingerprint image A, which has the minimal category difference compared to the input fingerprint information between the wet fingerprint image A and the dry fingerprint image B. For the wet fingerprint image A, among images (A1, A2, etc.) with a plurality of deformation levels, a specific image A1 that has the minimal category difference compared to the input fingerprint information may be used to generate second feature information, thereby generating unique feature information.

Figure 3:
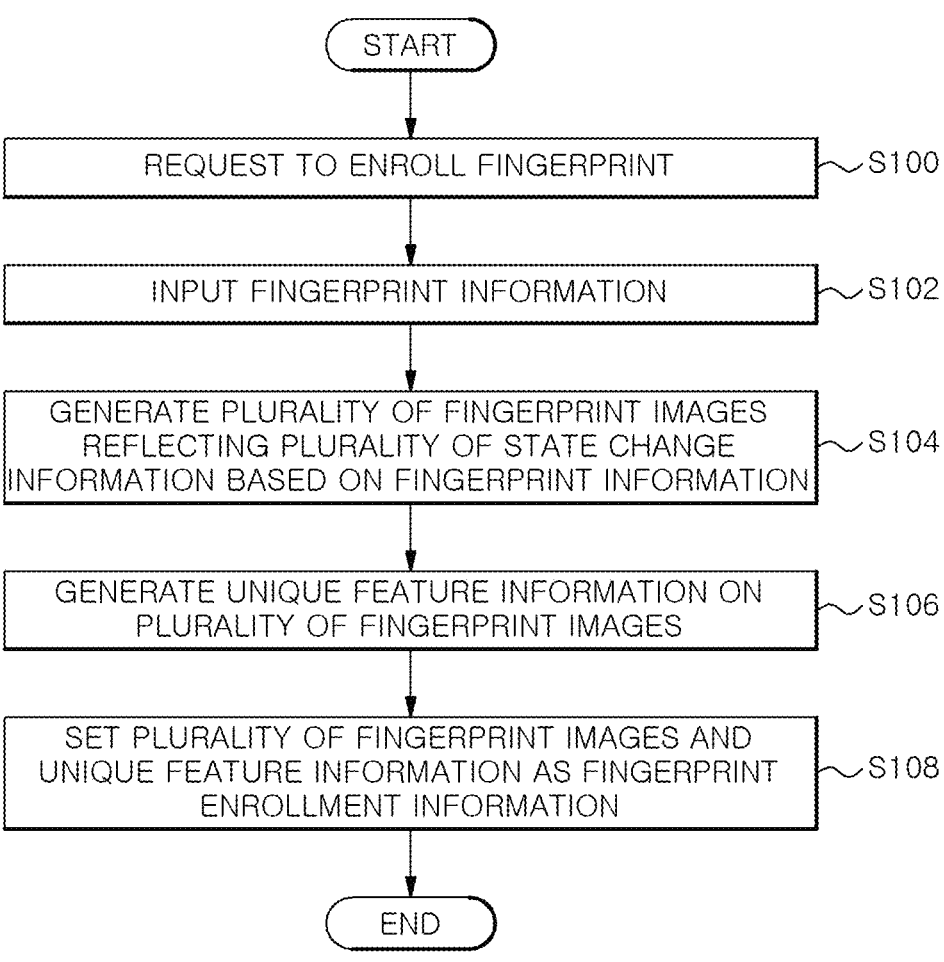
FIG. 3 is a flowchart exemplarily illustrating a process of enrolling a fingerprint, which is a fingerprint recognition method of the fingerprint recognition apparatus 100 that is robust to fingerprint state changes, according to an embodiment of the present invention.

FIG. 3 is a flowchart exemplarily illustrating a process of enrolling a fingerprint, which is a fingerprint recognition method of the fingerprint recognition apparatus 100 that is robust to fingerprint state changes, according to an embodiment of the present invention.

As illustrated in FIG. 3, when a fingerprint enrollment is requested to the fingerprint recognition apparatus 100 (S100), the fingerprint recognition apparatus 100 may receive a user's fingerprint information (a plurality of fingerprint information obtained from the fingerprint of a finger) obtained through the obtaining unit 110 as input (S102).

Subsequently, the fingerprint recognition apparatus 100 may generate a plurality of fingerprint images reflecting a plurality of state change information based on the input plurality of fingerprint information. For example, the processor 130 of the fingerprint recognition apparatus 100 may set the input fingerprint information as an input value of the artificial neural network 122 and process the input fingerprint information to generate a plurality of fingerprint images through the fingerprint image generation model 122a of the artificial neural network 122 (S104). Here, the plurality of state change information may include limited information within a range constrained by the deviations of the plurality of fingerprint information. The range constrained by the deviation may be set by the user during the initial fingerprint enrollment process. For example, the user may set the desired range of wet fingerprints to be 0.0 to 0.6.

Thereafter, the fingerprint recognition apparatus 100 may set the plurality of fingerprint images generated through the fingerprint image generation model 122a as input values for the feature extraction model 122b of the artificial neural network 122 to process the plurality of fingerprint images such that unique feature information for the plurality of fingerprint images is generated through the feature extraction model 122b (S106).

Subsequently, the fingerprint recognition apparatus 100 may set the generated plurality of fingerprint images and the generated unique feature information as fingerprint enrollment information and store them in the storing unit 120 (S108).

Figure 4:
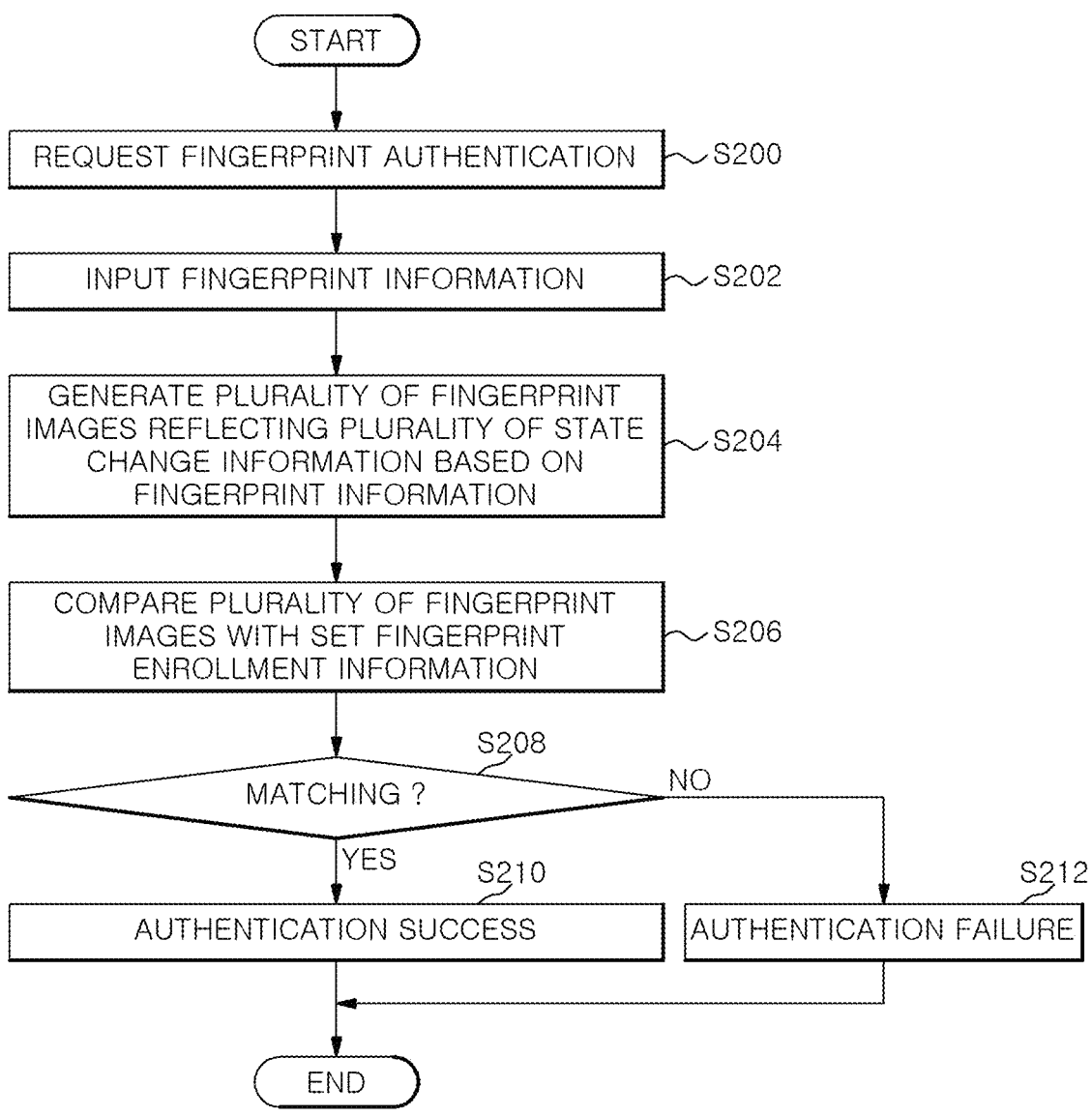
FIG. 4 is a flowchart exemplarily illustrating a process of authenticating a fingerprint, which is a fingerprint recognition method of the fingerprint recognition apparatus 100 that is robust to fingerprint state changes, according to an embodiment of the present invention.

FIG. 4 is a flowchart exemplarily illustrating a process of authenticating a fingerprint, which is a fingerprint recognition method of the fingerprint recognition apparatus 100 that is robust to fingerprint state changes, according to an embodiment of the present invention.

As illustrated in FIG. 4, when a fingerprint authentication is requested to the fingerprint recognition apparatus 100 (S200), the fingerprint recognition apparatus 100 may receive a user's fingerprint information (a plurality of fingerprint information obtained from the fingerprint of a finger) obtained through the obtaining unit 110 as input (S202).

Subsequently, the fingerprint recognition apparatus 100 may generate a plurality of fingerprint images reflecting a plurality of state change information based on the input plurality of fingerprint information. For example, the processor 130 of the fingerprint recognition apparatus 100 may set the input fingerprint information as an input value of the artificial neural network 122 and process the input fingerprint information to generate a plurality of fingerprint images through the fingerprint image generation model 122*a* of the artificial neural network 122 (S204). Here, the plurality of state change information may include limited information within a range constrained by the deviations of the plurality of fingerprint information. The range constrained by the deviation may gradually vary due to deviations between fingerprint information input one by one during the fingerprint authentication process.

Thereafter, the fingerprint recognition apparatus 100 may compare the plurality of fingerprint images generated through the fingerprint image generation model 122*a* with the fingerprint enrollment information set in FIG. 3 (S206).

As a result of the comparison in step S206, when the plurality of fingerprint images match the fingerprint enrollment information (S208), the fingerprint recognition apparatus 100 may allow authentication (process authentication success) for the input fingerprint information (S210).

In contrast, when the comparison in step S206 results in a mismatch between the plurality of fingerprint images and the fingerprint enrollment information (S208), the fingerprint recognition apparatus 100 may process the input fingerprint information as an authentication failure (S212).

Figure 5:
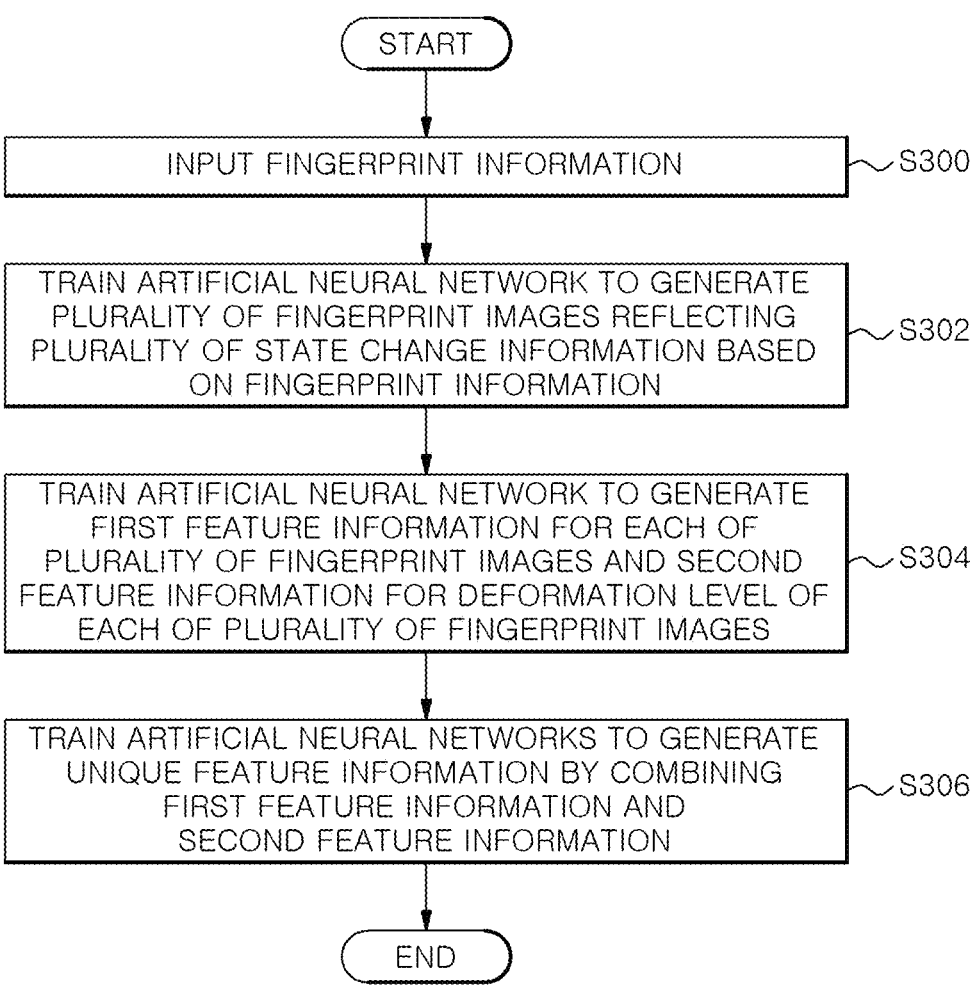
FIG. 5 is a flowchart exemplarily illustrating the process of training the artificial neural network 122 for fingerprint recognition in the fingerprint recognition apparatus 100 that is robust to fingerprint state changes, according to an embodiment of the present invention.

FIG. 5 is a flowchart exemplarily illustrating the process of training the artificial neural network 122 for fingerprint recognition in the fingerprint recognition apparatus 100 that is robust to fingerprint state changes, according to an embodiment of the present invention.

As illustrated in FIG. 5, when a plurality of fingerprint information is input to the fingerprint recognition apparatus 100 (S300), the fingerprint recognition apparatus 100 may train the artificial neural network 122 to generate a plurality of fingerprint images reflecting the plurality of state change information based on the inputted plurality of fingerprint information (S302). For example, the fingerprint recognition apparatus 100 may set the input fingerprint information as input values for the fingerprint image generation model 122*a* of the artificial neural network 122, and train the fingerprint image generation model 122*a* to generate a plurality of fingerprint images reflecting the plurality of state change information. In this case, the fingerprint recognition apparatus 100 may train the artificial neural network 122 to measure deviations between a plurality of fingerprint information, generate a plurality of state change information within the range constrained by the deviations, and generate a plurality of fingerprint images reflecting the plurality of state change information.

Subsequently, the fingerprint recognition apparatus 100 may generate first feature information for each of the plurality of fingerprint images, and second feature information for a deformation level of each of the plurality of fingerprint images. The fingerprint recognition apparatus 100 may then train the feature extraction model 122*b* of the artificial neural network 122 to combine the first feature information and the second feature information to generate unique feature information on the fingerprint information (S304 and S306).

According to embodiments of the present invention as described above, by reflecting the diversity of fingerprint states distorted by fingerprint state changes, e.g., humidity, pressure, deformation, etc., it is possible to adaptively cope with various environments during fingerprint recognition while securing high fingerprint recognition performance. In addition, according to embodiments of the present invention, by implementing feature unification for various fingerprint state changes, it has been implemented to enhance user convenience while minimizing the sense of inconsistency of fingerprint diversity during fingerprint enrollment and authentication processes.

Combinations of steps in each flowchart attached to the present disclosure may be executed by computer program instructions. Since the computer program instructions can be mounted on a processor of a general-purpose computer, a special purpose computer, or other programmable data processing equipment, the instructions executed by the processor of the computer or other programmable data processing equipment create a means for performing the functions described in each step of the flowchart. The computer program instructions can also be stored on a computer-usable or computer-readable storage medium which can be directed to a computer or other programmable data processing equipment to implement a function in a specific manner. Accordingly, the instructions stored on the computer-usable or computer-readable recording medium can also produce an article of manufacture containing an instruction means which performs the functions described in each step of the flowchart. The computer program instructions can also be mounted on a computer or other programmable data processing equipment. Accordingly, a series of operational steps are performed on a computer or other programmable data processing equipment to create a computer-executable process, and it is also possible for instructions to perform a computer or other programmable data processing equipment to provide steps for performing the functions described in each step of the flowchart.

In addition, each step may represent a module, a segment, or a portion of codes which contains one or more executable instructions for executing the specified logical function(s). It should also be noted that in some alternative embodiments, the functions mentioned in the steps may occur out of order. For example, two steps illustrated in succession may in fact be performed substantially simultaneously, or the steps may sometimes be performed in a reverse order depending on the corresponding function.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

What is claimed is:

1. An apparatus for fingerprint recognition, the apparatus comprising:

at least one memory capable of storing computer-executable instructions for generating unique feature information on fingerprint from a plurality of fingerprint information using a pre-trained artificial neural network;

a fingerprint sensing module configured to obtain a fingerprint image of a finger; and a processor configured to, by executing the computer-executable instructions, obtain a plurality of fingerprint information from the fingerprint image; and perform the computer-executable instructions to process to generate a plurality of fingerprint images reflecting a plurality of state change information based on the plurality of fingerprint information, and to generate the unique feature information for the plurality of fingerprint images, wherein the plurality of state change information includes limited information within a range constrained by deviations of the plurality of fingerprint information, and wherein the range constrained by the deviations is settable by a user.

2. The apparatus of claim 1, wherein the range constrained by the deviations is variable due to deviations between fingerprints input during authentication of the fingerprint image.

3. The apparatus of claim 1, wherein the pre-trained artificial neural network includes:

a fingerprint image generation model pre-trained to generate the plurality of fingerprint images reflecting the plurality of state change information by taking the plurality of fingerprint information as input; and a feature extraction model pre-trained to generate first feature information for each of the plurality of fingerprint images and second feature information for a deformation level of each of the plurality of fingerprint images by taking the plurality of fingerprint images as input, and to generate the unique feature information by combining the first feature information and the second feature information.

4. The apparatus of claim 3, wherein the feature extraction model is pre-trained to generate the unique feature information by minimizing a category of the plurality of fingerprint images and the deformation level.

5. The apparatus of claim 3, wherein the plurality of state change information includes at least one of humidity information, deformation information, or rotation information on the plurality of fingerprint information.

6. The apparatus of claim 5, wherein the plurality of fingerprint images includes at least one of a wet fingerprint image or a dry fingerprint image according to the humidity information, a deformed fingerprint image according to the deformation information, or a rotated fingerprint image according to the rotation information.

7. A method for fingerprint recognition performed by a fingerprint recognition apparatus, the method comprising:

receiving, in response to a fingerprint authentication request from the fingerprint recognition apparatus, a plurality of fingerprint information as input from a fingerprint image of a finger;

generating, based on the plurality of fingerprint information, a plurality of fingerprint images reflecting a plurality of state change information;

comparing the plurality of fingerprint images with preset fingerprint enrollment information; and allowing authentication for the plurality of fingerprint information when the plurality of fingerprint images match the preset fingerprint enrollment information, wherein the plurality of state change information includes limited information within a range constrained by deviations of the plurality of fingerprint information, the range constrained by the deviations being variable due to deviations between fingerprints input during the fingerprint authentication request, and wherein the range constrained by the deviations is settable by a user.

8. The method of claim 7, wherein the preset fingerprint enrollment information includes a fingerprint image corresponding to the plurality of fingerprint images and unique feature information on the plurality of fingerprint images.

9. The method of claim 8, wherein the unique feature information includes information combining first feature information for each of the plurality of fingerprint images and second feature information for a deformation level of each of the plurality of fingerprint images.

10. The method of claim 8, wherein the unique feature information is generated by minimizing a category of the plurality of fingerprint images and a deformation level of each of the plurality of fingerprint images.

11. The method of claim 10, wherein the plurality of fingerprint images includes at least one of a wet fingerprint image or a dry fingerprint image according to humidity information of the plurality of fingerprint images, a deformed fingerprint image according to deformation information of the plurality of fingerprint images, or a rotated fingerprint image according to rotation information of the plurality of fingerprint images.

12. A method for training an artificial neural network for fingerprint recognition of a fingerprint recognition apparatus, the method comprising a process of training the artificial neural network to:

generate, when a plurality of fingerprint information is input to the fingerprint recognition apparatus, a plurality of fingerprint images reflecting a plurality of state change information based on the plurality of fingerprint information;

generate first feature information for each of the plurality of fingerprint images, and second feature information for a deformation level of each of the plurality of fingerprint images; and generate unique feature information on the plurality of fingerprint information by combining the first feature information and the second feature information, wherein the plurality of state change information includes limited information within a range constrained by deviations of the plurality of fingerprint information, and wherein the range constrained by the deviations is settable by a user.

13. The method of claim 12, further comprising a process of training the artificial neural network to:

measure deviations between the plurality of fingerprint information;

generate the plurality of state change information within a range constrained by the deviations; and generate the plurality of fingerprint images by reflecting the plurality of state change information.

14. The method of claim 13, wherein the plurality of state change information includes at least one of humidity information, deformation information, or rotation information on the plurality of fingerprint information.

15. The method of claim 14, wherein the plurality of fingerprint images includes at least one of a wet fingerprint image or a dry fingerprint image according to the humidity information, a deformed fingerprint image according to the deformation information, or a rotated fingerprint image according to the rotation information.

16. The method of claim 13, further comprising a process of training the artificial neural network to minimize a category of the plurality of fingerprint images and the deformation level.

* * * * *